United States Patent [19]

Hogue et al.

[11] Patent Number: 5,123,441

[45] Date of Patent: Jun. 23, 1992

[54] APPARATUS FOR FLUID TRANSFER

[75] Inventors: Gregory E. Hogue, Buckeye; William M. Finch, Paradise Valley; John W. Pickrell, Scottsdale, all of Ariz.

[73] Assignee: Wilbur-Ellis Company, Buckeye, Ariz.

[21] Appl. No.: 563,292

[22] Filed: Aug. 6, 1990

[51] Int. Cl.5 .............................. F16K 27/08
[52] U.S. Cl. .................. 137/381; 137/565; 137/614.03; 141/384
[58] Field of Search ............... 251/144; 137/322, 327, 137/614.03, 377, 381, 565; 141/350, 353, 384, 390

[56] References Cited

U.S. PATENT DOCUMENTS

| | | |
|---|---|---|
| 983,019 | 1/1911 | Beebe . |
| 1,004,638 | 10/1911 | Ferry . |
| 1,475,142 | 11/1923 | Ruegsegger . |
| 1,960,532 | 5/1934 | Dunham . |
| 2,638,914 | 5/1953 | Flaith et al. . |
| 2,665,926 | 1/1954 | Fraser ................... 141/384 |
| 2,790,571 | 4/1957 | Flaith et al. . |
| 3,055,405 | 9/1962 | Pase ..................... 141/384 |
| 3,205,923 | 9/1965 | Wilson ................... 141/384 |
| 3,228,413 | 1/1966 | Stevens, Jr. ........... 137/322 |
| 3,261,382 | 7/1966 | Ensign .................. 141/384 |
| 4,095,713 | 6/1978 | Norton ................... 137/377 |
| 4,212,315 | 7/1980 | Fahl et al. ............. 137/377 |
| 4,928,726 | 5/1990 | Johnson et al. ........ 137/327 |

FOREIGN PATENT DOCUMENTS 1307301 9/1962 France .............. 137/614.03

Primary Examiner—Michael Chambers
Attorney, Agent, or Firm—Worrel & Worrel

[57] ABSTRACT

An apparatus for fluid transfer having a housing adapted to be mounted on a container adapted to house fluid, a valve mounted with the housing operable in a normal first attitude to seal the container therethrough and adjustable to a second attitude to permit fluid to pass through the valve and a mechanism engageable with the valve to move the valve to the second attitude for the transfer of the fluid therethrough and wherein the housing is recessed within a portion of the container so as to protect it from damage.

13 Claims, 4 Drawing Sheets

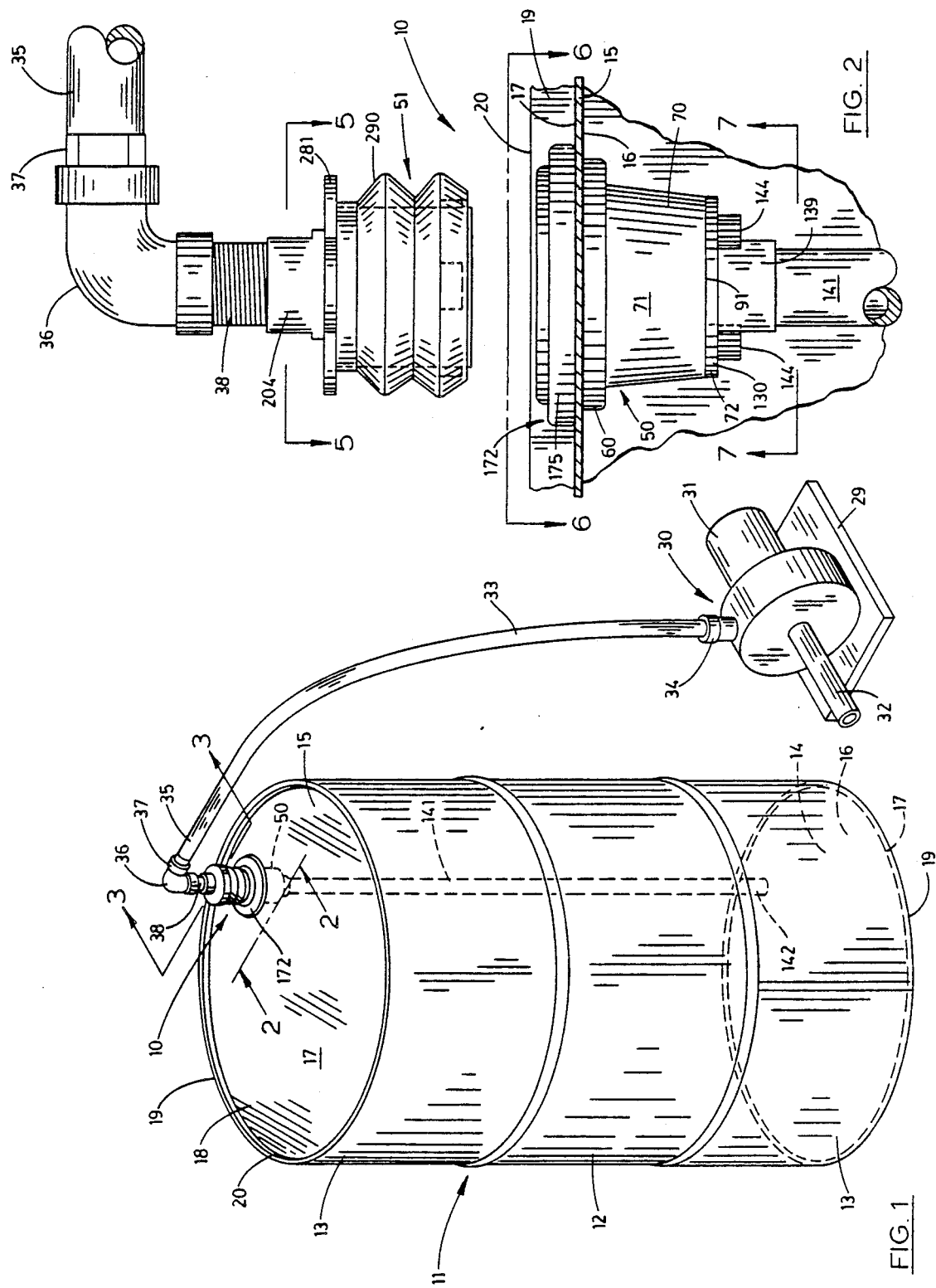

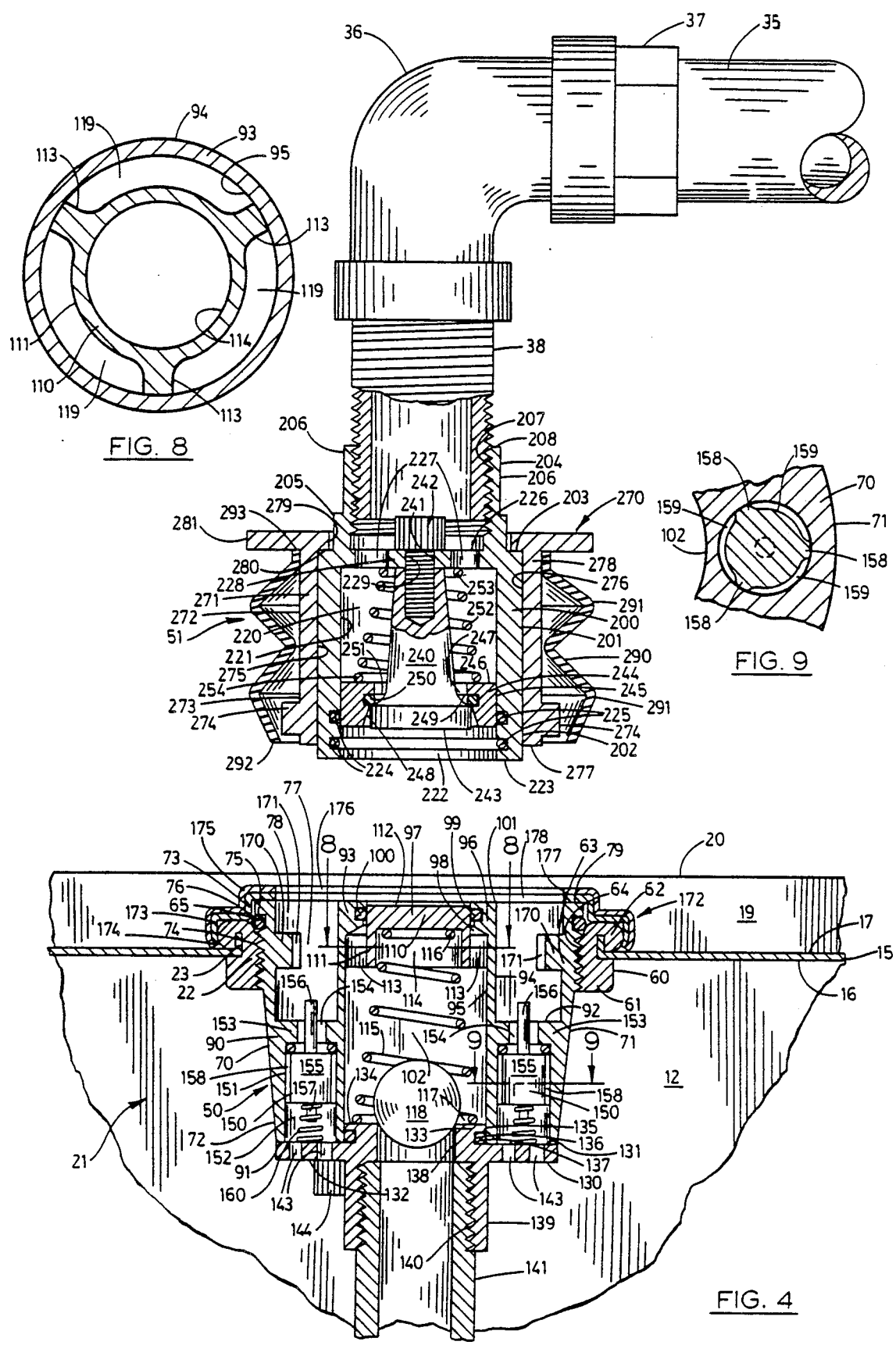

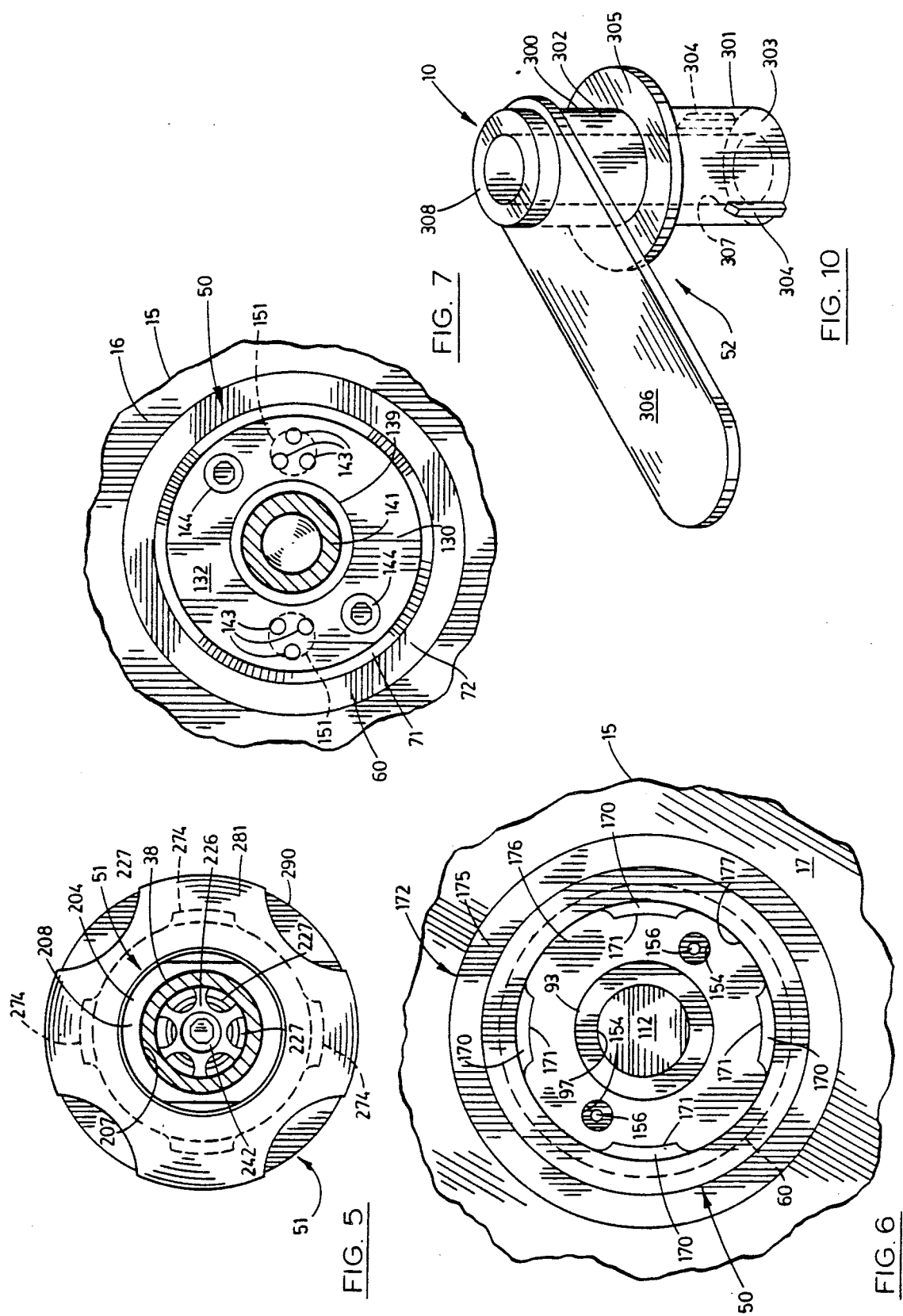

APPARATUS FOR FLUID TRANSFER

BACKGROUND OF THE INVENTION

1. Field of the Invention

The present invention relates to an apparatus for fluid transfer and more particularly to such an apparatus which is particularly well suited to use, in combination with a container, in storing, transporting and transferring hazardous materials, such as toxic substances, in such a manner as virtually to preclude the risk of contamination of the environment and exposure to the hazardous materials by persons employing them.

2. Description of the Prior Art

The identification of certain substances as hazardous and, more specifically, the recognition by manufacturers, scientific and governmental authorities and the public at large of the multiplicity of risks, both short term and long term, associated with the use of such substances has caused considerable effort to be devoted to the development of devices for handling such materials. In this regard, the hazards associated with the containerizing, storing, transporting and using of toxic substances and the like have caused considerable developmental work to be devoted to the strengthening of containers, valves and transferring equipment and the isolation of the substances during the transfer to and from the containers. However, these problems persist and are particularly acute in the event of damage to such containers. In the case of damage, the risk of leakage, or, more critically, a general toxic spill, is substantial. Still further, a chronic problem resides in the safe disposal of such containers once used.

Conventional containers for the housing of such substances have been characterized by elaborate valve systems designed to extract the substances from the containers in such a fashion as to be sealed from the environment. In all cases of which the applicants are aware, such valves extend well beyond the end of the container and therefore are exposed to impact during handling. This is a risk, for example, where the containers are inadvertently dropped, or fall from vehicles during transport along roadways, or where the transporting vehicle is involved in an accident. The exposure of such prior art valves to impact creates a substantial risk that during such inadvertent contact, the valve will be damaged in such a fashion as to leak the substances from the container or may actually be broken off so as to cause a substantial spill of the toxic substance into the environment. The hazards occasioned by such unintended discharges are well recognized and constitute a considerable hazard to health and the environment. This has resulted in immense monitary judgments against manufacturers, common carriers and others. Insurance rates have escalated in direct proportion to such judgements.

Therefore, it has long been known that it would be desirable to have an apparatus for fluid transfer which is particularly well suited to the containerizing, storing, transporting, transferring and using of virtually any fluid substance, but particularly toxic substances so as virtually to ensure that such substances are not inadvertently exposed to the environment or to those persons handling the substances and which obviate the difficulty of disposing of such containers once emptied of their contents.

SUMMARY OF THE INVENTION

Therefore, it is an object of the present invention to provide an improved apparatus for fluid transfer.

Another object is to provide such an apparatus which can be employed on virtually any type of container and in combination with virtually any type of handling facilities and equipment and, similarly, can be employed in the transfer of virtually any fluid substance.

Another object is to provide such an apparatus which can be manufactured as an integral part of newly manufactured containers as well as being retrofitted on existing containers.

Another object is to provide such an apparatus which is so constructed as to be protected from damage by impact as a result, for example, of being dropped thereby substantially avoiding the risk of leakage or spilling as a consequence.

Another object is to provide such an apparatus which is protected from damage by the configuration of existing conventional containers while being fully compatible with use of the container.

Another object is to provide such an apparatus which permits containers for such substances, and particularly toxic substances, to be reused virtually indefinitely so as to avoid the proliferation of toxic containers for which no safe and effective method of disposal exists.

Another object is to provide such an apparatus which is composed of several components which interoperate in such a fashion as to isolate the toxic substance from the environment during extraction thereof from the container, both during connection to the container for the extraction of the substance therefrom as well as at the time of disconnection from the container when the desired quantity of the substance has been removed.

Another object is to provide such an apparatus which conveniently, dependably and safely permits the container, once emptied, to be opened by authorized personnel for the refilling of the container with the fluid substance.

Another object is to provide such an apparatus which affords a means by which the container automatically seals at the desired time and under the desired conditions and affords a capability of indicating when the container has been subject to tampering by unauthorized personnel.

Further objects and advantages are to provide improved elements and arrangements thereof in an apparatus for the purposes described, which are dependable, durable, and fully effective in accomplishing their intended purposes.

These and other objects and advantages are achieved in the preferred embodiment of the apparatus for fluid transfer of the present invention by including a housing adapted to be mounted on a container adapted to contain fluid, a valve mounted within the housing operable in a normal first attitude to seal the container therethrough and adjustable to a second attitude to permit fluid to pass through the valve and a mechanism engageable with the valve for moving the valve to the second attitude for the transfer of fluid therethrough and wherein the housing is recessed within a portion of the container so as to protect it from damage.

BRIEF DESCRIPTION OF THE DRAWINGS

FIG. 1 is a perspective view showing the apparatus for fluid transfer of the present invention in a typical operative environment adapted for the transfer of fluid from a drum through the medium of a fluid pump.

FIG. 2 is a somewhat enlarged, fragmentary, transverse vertical section taken on line 2—2 in FIG. 1.

FIG. 4 is a somewhat enlarged, fragmentary, vertical section taken from the same position as FIG. 3, but showing the coupling of the present invention disconnected from teh valve assembly thereof.

FIG. 5 is a somewhat enlarged, horizontal section taken on line 5—5 in FIG. 2.

FIG. 6 is a somewhat enlarged, fragmentary, top plan view taken on line 6—6 in FIG. 2.

FIG. 7 is a somewhat enlarged, horizontal section taken on line 7—7 in FIG. 2.

FIG. 8 is a somewhat enlarged, horizontal section taken from a position indicated by line 8—8 in FIG. 4.

FIG. 9 is a somewhat enlarged, fragmentary, horizontal section taken from a position indicated by line 9—9 in FIG. 4.

FIG. 10 is a perspective view of the housing removing tool of the apparatus for fluid transfer of the present invention.

DESCRIPTION OF THE PREFERRED EMBODIMENT

Figure 3:
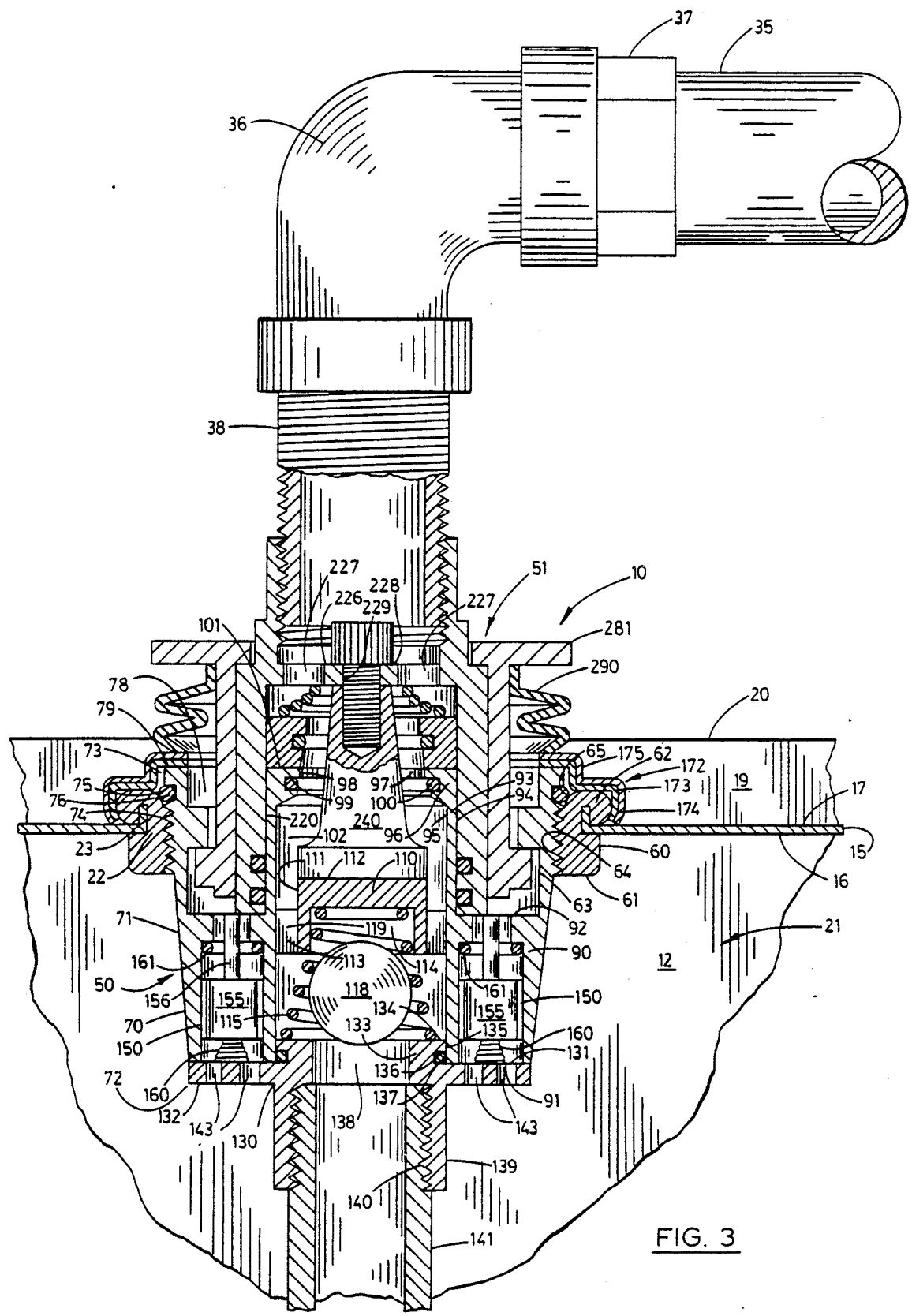
FIG. 3 is a somewhat further enlarged, fragmentary, vertical section taken on line 3—3 in FIG. 1.

Referring more particularly to the drawings, the apparatus for fluid transfer of the present invention is generally indicated by the numeral 10 in FIG. 1. The apparatus can be employed in significantly varied environments and in a host of different embodiments. The environment shown in the drawings and described herein is employed for illustrative convenience and represents only one such typical operative environment. A housing, container, vessel or drum 11 has a substantially cylindrical side wall 12 having opposite end portions 13. The drum has a bottom wall 14 and an opposite top wall 15 individually mounted on the opposite end portions of the side wall. The bottom and top walls have interior surfaces 16 and opposite exterior surfaces 17. The bottom and top walls have peripheral edge portions 18 which are individually welded on the opposite end portions of the side wall forming a circular ridge or chime 19. Each chime has an upper edge 20 extending endwardly of its respective bottom or top wall. The drum is thus so constructed as to have a fluid tight internal chamber 21. A bung hole or opening 22 is formed in and extends through the top wall 15 adjacent to the chime and is bounded by a peripheral edge 23.

As shown in FIG. 1, a mounting plate 29 mounts a conventional fluid pump 30. The fluid pump has a drive motor 31 and a discharge conduit 32. The discharge conduit is connected by any suitable means, not shown, to any desired fluid receiving system, not shown. An intake conduit 33 is mounted on the fluid pump 30 by a coupling 34. The intake conduit has a distal end portion 35 mounting an elbow 36 by means of a union 37. The elbow has an externally screw threaded end portion 38.

The apparatus for fluid transfer 10, in the preferred embodiment, has three main components. The first is a female or valve assembly 50 shown best in FIGS. 3 and 4. The second is a male assembly or coupling 51, also shown best in FIGS. 3 and 4. The third is a housing removing tool 52 shown in FIG. 10.

FEMALE OR VALVE ASSEMBLY

The female or valve assembly 50 has a mounting assembly or collar 60 consisting of an interior ring 61 which is received within the opening 22 of the drum 11 and a crimped portion 62 extending outwardly through the opening and mounted on the peripheral edge 23 bounding the opening in fluid tight relation. The mounting collar has an internally screw threaded bore 63 having internal screw threads 64. Bounding the internally screw threaded bore 63 is a shoulder surface 65.

The valve assembly 50 has a housing 70 having a frustoconical external surface 71 and a substantially flat lower end portion 72. The housing has an upper end portion 73 having external screw threads 74 formed thereabout and a ring groove 75 housing an O-ring 76 inscribed about the upper end portion above the external screw threads. The housing 70 is screw-threadably mounted in the mounting collar 60 by screw threaded engagement of the external screw threads 74 with the internal screw threads 64 of the mounting collar. The housing is thus mounted in fluid tight relation within the mounting collar with the O-ring 76 engaging the shoulder surface 65 in fluid tight engagement.

The housing 70 has an internal upper chamber 77 communicating external of the upper end portion 73 through a mouth 78 bounded by an annular end surface 79 extending about the mouth. As can best be seen upon reference to FIGS. 3 and 4, the annular end surface which constitutes the upper most portion of the housing is recessed from the upper edge 20 of the chime 19 of the drum 11.

The housing 70 has a lower body portion 90 extending from the upper chamber 77 to the lower end portion 72. The lower body portion has a lower surface 91. The lower body portion has an upper surface of floor surface 92 consituting the floor surface of the upper chamber 77.

The housing 70 has a central projection or member 93 having a cylindrical outer surface 94 and a cylindrical internal surface 95. The member has an upper end wall 96 which, in turn, has a central bore or port 97. The port has a substantially cylindrical internal surface 98 containing an annular ring groove 99 housing an O-ring 100. The port is bounded by an annular end surface 101 which, as can best be seen in FIGS. 3 and 4, is substantially coplanar with the annular end surface 79 of the housing. The member 93 thus has a central passage 102 extending entirely therethrough.

A contact member 110, having an outer cylindrical surface 111, is slidably mounted within the central port 97 of the central member 93 in fluid sealing engagement with the O-ring 100. The contact member has a contact surface 112 and three radially extending guides 113 extending outwardly from the outer cylindrical surface and into engagement with the internal surface 95 of the central member 93. The contact member has a lower chamber 114 facing inwardly of the central passage 102. A tapered coil spring 115 has an upper end portion 116 and an opposite lower end portion 117. The upper end portion is received in the lower chamber of the contact member. A valve ball 118 is received within the lower end portion of the coil spring and is not attached thereto so as to be capable of free floating movement within the bounds defined by the coil spring. The valve ball is captured on the lower side thereof by means hereinafter described. The tapered coil spring 115, valve ball 118 and related structure operate as a check valve to prevent substances from being passed therethrough into the internal chamber 21 of the drum. Other types of check valves can be employed for this purpose in substitute for the coil spring and valve ball, although it is believed they are particularly well suited to operation as herein described.

Referring more particularly to FIG. 8, the contact member, and more particularly the guides 113 thereof, define fluid passages 119 about the contact member within the central passage 102 of the central member.

An end plate, having an upper surface 131 and an opposite lower surface 132, is mounted on the lower surface 91 of the lower body portion 90. The end plate has a central protection 133 having a substantially flat upper surface 134 and a cylindrical outer surface 135. The outer surface has a ring groove 136 extending thereabout housing an O-ring 137. The end plate is mounted on the housing 70 with the central projection 133 received within the central passage 102 at the lower end portion 72 of the housing 70. With the O-ring 137 engaging the internal surface 95 in fluid sealing relation. The end plate has a central bore 138 extending therethrough in coaxial relation to the central passage 102 and having a collar 139 borne by and extending from the lower surface 132 thereof. The collar has internal screw threads 140 in which is mounted an extraction conduit 141 having a lower end portion 142 adjacent to the interior surface 16 of the bottom wall 14 of the drum 11. As shown best in FIG. 7, two sets of three air holes 143 extend through the mounting plate in the positions shown in FIGS. 3, 4 and 7. The mounting plate is secured on the lower surface 91 of the lower body portion by a pair of bolts 144 extending through holes in the mounting plate and into screw threaded holes in the lower body portion 90, not shown. Thus, the lower end portion 117 of the tapered coil spring 115 engages the upper surface 134 of the central projection 133 and the valve ball 118 is captured in free floating relation within the tapered coil spring, as best shown in FIGS. 3 and 4.

A pair of air valve assemblies 150 are individually provided in the lower body portion 90 of the housing 70 in the positions best shown in FIGS. 3, 4 and 7. Each air valve assembly includes a cylindrical bore 151 extending into the lower body portion through the lower surface 91 laterally disposed relative to the central passage 102 and individually in communication with one set of three air holes 143. The cylindrical bore is defined by a cylindrical surface 152 and terminates at an upper end wall 153. An upper bore 154 extends through the upper end wall to establish fluid communication between the cylindrical bore 51 and the upper chamber 77 of the housing 70.

A valve member 155 is slidably received within each cylindrical bore 151 of each air valve assembly 150. Each valve member has an upper contact pin 156, which extends through the upper bore 154, and a lower contact pin 157, which extends in the direction of the air holes 143. As can best be seen in FIG. 9, the valve member has three guides 158 disposed in slidable engagement with the cylindrical surface 152 of the cylindrical bore and defining air passages 159 therebetween about the valve member. A tapered coil spring 160 is received about the lower contact pin and is captured between the valve member and the end plate 130. A resilient valve seat 161 is mounted on the upper end wall 153 about the upper bore 154 and the upper contact pin 156 for fluid sealing engagement with the valve member when the valve member is disposed in the position shown in FIG. 4.

As will hereinafter be described in greater detail, the air valve assembly 150 can also be constructed without the upper contact pins 156 for automatic operation of the air valve assemblies by the development of a vacuum within the internal chamber 21 of the drum 11 as fluid is withdrawn therefrom.

Referring more paricularly to FIGS. 4 and 6, four internal lugs 170, having arcuate surfaces 171, are mounted on the housing within the upper chamber 77 spaced in predetermined positions from the floor surface 92 of the upper chamber, as shown in FIG. 4, and from each other, as shown in FIG . 6.

The mounting collar 60 and upper end portion 73 of the housing 70 are sealed by a sealing assembly 172. The sealing assembly includes a plastic seal 173, having peripheral portions 174, which is received about and covers the collar and upper end portion 73 of the housing. The peripheral portions 174 of the plastic seal are crimped about the crimped portion 62 of the mounting collar to retain the plastic seal in position. A metal securing ring 175 is mounted on the plastic seal extending about the crimped portion 62 of the mounting collar in covering relation to the peripheral portions 174 of the plastic seal. The metal securing ring has a circular opening 176 which is defined by a peripheral edge 177 coinciding with the mouth 78 of the upper chamber 77 and thus just overlaying the annular end surface 79 which is immediately beneath the plastic seal 173. In operatin the plastic seal is severed by an operator running a knife or other sharp instrument inwardly of the peripheral edge 177 bounding the circular opening 176 of the metal securing ring so as to sever the plastic seal forming a circular opening 178, as will hereinafter be described in greater detail.

MALE ASSEMBLY OR COUPLING

The male assembly or coupling 51 of the apparatus for fluid transfer 10 of the present invention has a body 200 having a cylindrical outer surface 201. The body has a lower end portion 202 and an opposite annular shoulder 203. The body has an upper end portion 204 having a substantially cylindrical outer surface 205. The substantially cylindrical outer surface 205 is cylindrical except for a pair of substantially parrallel wrench surfaces 206. The upper end portion 204 has an internally screw threaded opening 207 and an annular upper surface 208.

A cylindrical bore 220 defined by a cylindrical surface 221 extends inwardly of the body 200 from a mouth 222. The mouth is bounded by an annular lower surface 223. The mouth is circumscribed by a pair of ring grooves 224 individually housing O-rings 225. A spider plate 226, best shown in FIG. 5, is mounted within the body extending transversely of the cylindrical bore 220 substantially in alignment with the annular shoulder 203. The spider plate has a plurality of fluid openings 227 extending therethrough and a central portion 228 having a bolt hole 229 extending therethrough concentric to the longitudinal axis of the cylindrical bore 220.

A plunger or actuator 240, having an internally screw threaded bore 241, is mounted on the spider plate 226 by a bolt 242 extending through the spider plate and screw-threadably secured in the screw threaded bore 241 to mount the actuator concentric to the longitudinal axis of the cylindrical bore 220. The actuator has a contact surface 243 facing the mouth 222. A sealing collar 244, having an outer cylindrical surface 245 is slidably received in the cylindrical bore 220 with the outer cylindrical surface 245 thereof in sliding engagement with the cylindrical surface 221 of the cylindrical bore 220. The sealing collar has an upper spring surface 246 and a central fluid apssage 247 extending therethrough. The fluid passage is defined by an internal surface 248 having a circumscribing ring groove 249 housing an O-ring 250. The actuator has an outer sealing surface 251 disposed for fluid sealing engagement with the O-ring in the arrangement shown in FIG. 4. A tapered coil spring 252, having an upper end portion 253 and an opposite lower end portion 254 exends about the actuator with the upper end portion engaging the spider plate 226 and the lower end portion engaging the sealing collar 244 so as resiliently to retain the sealing collar in the position in fluid sealing relation with the O-ring 250, as shown in FIG. 4.

An attachment collar 270 is slidably received about the body 200 of the coupling 51. The attachment collar has a cylindrical body 271 having a cylindrical outer surface 272 and a lower end portion 273. As shown in FIGS. 3, 4 and 5, the four attachment lugs 274 are mounted on the cylindrical outer surface 272 of the attachment collar for engagement, as will hereinafter be described, with the internal lugs 170 of the housing 70. The cylindrical body has an internal passage 275 defined by a cylindrical internal surface 276. The cylindrical body has an annular end surface 277 extending about the lower end portion 202 of the body 200. The body has an upper end portion 278 having an upper opening 279 extending therethrough in communication with the internal passage 275, but of smaller diameter so as to form an internal annular lip 280 adapted gravitationally to rest on the annular shoulder 203 of the body 200, as shown in FIGS. 3 and 4. A grasping flange 281 is mounted on the upper end portion 278 extending outwardly therefrom and having a shape convenient for grasping and operation thereof.

A resilient, accordion type shroud 290 is received about the cylindrical body 271 of the attachment collar 270 and has pleats 291 adapted to permit the shroud to be collapsed from the uncollapsed condition shown in FIG. 4 to the collapsed condition shown in FIG. 3. The shroud has an annular lower edge 292 and an opposite annular upper edge 293.

HOUSING REMOVING TOOL

The apparatus for fluid transfer 10 includes the housing removing tool 52 shown in FIG. 10. The housing removing tool has a cylindrical body 300 having a lower portion 301 and an opposite upper portion 302. The lower portion 301. The lower portion 301 has a cylindrical outer surface 303 mounting a pair of engagement lugs 304 dimensioned for engagement with the internal lugs 170 within the upper chamber 77 of the housing 70, as will hereinafter be described. The lower and upper portions of the body are separated by a radially extending flange 305 operble to deflect any fluid discharged by pressure within the internal chamber 21 of the drum 11 upon removal of the housing 70 using the housing removing tool. A handle 306 is mounted on the upper portion 302. An internal passage 307 extends through the cylindrical body defined by a cylindrical surface 308.

OPERATION

The operation of the described embodiment of the present invention is believed to be clearly apparent and is briefly summarized at this point. The drum 11 is fitted with the valve assembly 50 in the manner heretofore described either at the time of manufacture of the drum, or can be retrofitted into existing drums or other containers in the manner decribed.

Where the internal chamber 21 of the drum is to be filled with a fluid for subsequent use by the user, the housing removal tool 52 shown in FIG. 10 is employed to remove the housing 70 from the mounting collar 60. At this time the sealing assembly 172 is not in place. The lower portion 301 of the cylindrical body 300 of the housing removing tool 52 is inserted into the upper chamber 77 of the housing 70 and disposed so that the engagement lugs 304 engage two of the internal lugs 170 within the upper chamber. The housing removing tool is preferably pressed downwardly so that the lower portion 301 engages and depresses the upper contact pins 156 of the air valve assemblies 150 to open the air valve assemblies to equalize the air pressure within the internal chamber 21 and ambient air pressure. The operator then, grasping the handle 306, applies rotational pressure to the internal lugs 170 of the housing in either a clockwise or counterclockwise direction, depending upon the type of screw threads employed, screw-threadably to remove the housing from the mounting collar 60. The flange 305 is operable to deflect any fluid which might be propelled upwardly by the release of pressure within the internal chamber during removal of the housing. The housing 70 and extraction conduit 141 are then removed as a unit from within the drum 11 so as to open the screw threaded bore 63. The drum is then filled using conventional means with the fluid to the prescribed level.

The drum 11 is sealed by a reversal of the steps involved so as screw threadably again to mount the housing 70 within the internally screw threaded bore 63 to position the O-ring 76 in sealing engagement with the shoulder surface 65. The sealing assembly 172 is then installed to provide a last security seal against leakage and for the purpose of identifying when the container has been subject to tampering by unauthorized persons. As can be seen upon reference to FIG. 4, the actual physical sealing of the container is accomplished by O-ring 76 engaging the shoulder surface 65 in fluid sealing engagement; O-ring 100 engageing outer cylindrical surface 111 of the contact member in fluid sealing relation; and valve members 155 engaging their respective resilient valve seats 161 in fluid sealing relation.

Significantly, the entire housing 70 and sealing assembly 172 are recessed beneath the upper edge 20 of the chime 19, as shown in FIG. 4. Thus, the upper edge of the chime constitutes a protective bearer for the housing so as to prevent damage thereto. Furthermore, there are no exposed portions of the valve assembly. Should the drum be dropped during handling, impact with the earth is absorbed by the chime and contact with the housing 70 is prevented. This is true even in the case of drums inadvertently dropped from moving vehicles onto a hardened roadway. The drum thus constitutes a secure single unit which avoids the inadvertent release of toxic substances in the case of accident or negligent handling of the drum. Similarly, since the housing is substantially flush with the top wall 15 and is of such a construction as to withstand impact, even where the apparatus is mounted on a container not having a chime the apparatus is substantially impervious to damage and leakage.

Furthermore, as previously noted, tampering involving the drum can immediately be detected as a result of the sealing assembly 172. If the plastic seal 173 has been cut prior to receipt by authorized personnel, such personnel are immediately alerted that tampering has occurred.

When it is desired to extract the fluid contents from the drum 11, the coupling 51 is screw-threadably secured on the externally screw threaded end portion 38 of the elbow 36 as best shown in FIGS. 1 and 4. Using a sharp instrument, such as a knife, the operator severs the plastic seal 173 of the sealing assembly 172 about the peripheral edge 177 of the metal securing ring 175 and removes the central portion thereof forming the circular opening 178 and thereby exposing the upper chamber 77 of the housing and the central member 93 thereof. Grasping the elbow 36 and grasping flange 281, the operator presses the lower end portion 202 of the body 200 about the central member 93 so that the central member slides into the cylindrical bore 220 thereof. As such downward movement is continued, the contact surface 243 of the actuator 240 engages the contact surface 112 of the contact member 110 so as to force the contact member from the position shown in FIG. 4 to the position shown in FIG. 3. At the same time, the annular end surface 101 of the central member contacts the sealing collar 244 so as to move it from the position shown in FIG. 4 to the position shown in FIG. 3. This draws the O-ring 250 away from the outer sealing surface 251 of the actuator. The attachment collar 270 is then rotated to position the attachment lugs 274 beneath the internal lugs 170 of the housing so as to lock the coupling 51 in fluid transferring relation to the valve assembly 50 in the position shown in FIG. 3.

Thus, upon reference to FIG. 3, it will be seen that a complete and open path is established for movement of the fluid from within the internal chamber 21 of the drum 11 through the extraction conduit 241, about the valve ball 118, through the fluid passages 119 about the contact member 110, through the central passage 102 of the central member 93, through the port 97, through the central fluid passage 247, through the tapered coil spring 252, through the fluid openings 227 of the spider plate 226 and to the fluid pump 30 through the intake conduit 33. The pump is, of course, operable to pump fluid received through the intake conduit 33 from the fluid pump through the discharge conduit 32 to the desired destination for use. As will be apparent, once pumping by the fluid pump 30 has begun, the valve ball 118 is lifted from rested engagement in the central bore 138 of the end plate 130. Thereafter, the valve ball is free to be retained by such fluid motion in the position shown in FIG. 3 so that a continuous path is maintained for the fluid from the internal chamber 21 of the drum 11 to the fluid pump 30.

Similarly, as cna be seen upon reference to FIG. 3, the annular lower surface 223 of the coupling 51 depresses the upper contact pins 156 of the air valve assemblies 150 in the position heretofore described so as to move the valve members 155 thereof from sealing engagement with the resilient valve seats 161. Thus, a path of ambient air movement is established from externally of the container to the internal chamber 21 through the upper chamber 77 of the housing 70, the upper bores 154, the cylindrical bores 151, and the air holes 143. In alternate embodiment of air valve assemblies having no upper contact pins 156 heretofore described, the development of a vacuum within the internal chamber of the drum as fluid is withdrawn is applied to the valve members ultimately drawing them away from the resilient valve seats 161. This automatically admits air to the internal chamber to reduce the vacuum and allow the fluid to be extracted at the normal rate. The shroud 290 operates to prevent any of the fluid within the drum from inadvertently escaping, particularly at the time of attachment of the collar 51 to be valve assembly 50. However, the shroud is sufficiently loose that ambient air can gain access to the upper chamber and through the air valve assemblies 150 to the internal chamber 21 so as to prevent a vacuum from forming within the internal chamber of the drum as the fluid is extracted therefrom.

When the desired quantity of fluid has been extracted from the internal chamber 21 of the drum 11, operation of the fluid pump 30 is discontinued. After allowing sufficient time for fluid to drain back into the drum and into the fluid pump, the coupling 51 is removed from the described engagement with the valve assembly 50 shown in FIG. 3 by a reversal of the steps heretofore described. Thus, the attachment collar 270 is rotated in the opposite direction to release the attachment lugs 274 from the internal lugs 170 of the housing 70 and the coupling is pulled free from the housing. The operable portions of the housing and coupling are instantly returned to their normal sealing positions shown in FIG. 4 avoiding leakage of fluid or fluid vapors from the valve assembly and the coupling. As can be visualized in FIG. 4, the tapered coil spring 252 returns the sealing collar 244 to the same sealing position shown in FIG. 4 immediately upon removal of the coupling 51 from the valve assembly 50. Thus, residual fluie within the coupling is entrapped within the coupling, elbow 36 and intake conduit 33. The drum and the coupling and related equipment are thus immediately sealed, upon such disconnection for subsequent use without risk of inadvertent leakage of fluid or fluid vapor from either.

The tapered coil spring 115 operates to retain the valve ball 118 for movement within the limited area defined thereby and the valve ball prevents foreign substances from being intentionally or inadvertently deposited within teh internal chamber 21.

Once the drum 11 has been emptied of its fluid contents, it can be returned to the manufacturer or supplier for refilling in the manner described. The sealing assembly 172 again operates to indicate when tampering has taken place when the drums are received by the supplier. Since the peripheral edge 177 of the metal securing ring 175 overlays the annular end surface 79 of the housing 70, the huosing cannot be removed from the mounting collar 60 without damage to the metal securing ring. Where this has occurred, authorized personnel are alerted upon receipt of the drum that the internal chamber 21 may have been filled with a substance other than that authorized by the manufacturer or supplier. At a time of use of the housing removing tool 52, the lower portion 301 of the housing removing tool engages the upper contact pins 156 of the air valve assemblies 150 to open the air valve assemblies to permit the air pressure within the internal chamber 21 to be equalized with ambient air pressure prior to removal of the housing 70. Thus, the apparatus for fluid transfer 10 of the present invention completely eliminates the ecological problems associated with conventional devices including that of disposing of the containers and particularly those which have contained toxic materials.

Therefore, the apparatus for fluid transfer of the present invention is particularly well suited to the containerizing, storing, transporting transferring and using of virtually any fluid substance substantially ensuring that such substances are not inadvertently exposed to the environment or to those persons handling the substances and obviating the difficulty of disposing of the containers once emptied of their contents.

Although the invention has been herein shown and described in what is conceived to be the most practical and preferred embodiment, it is recognized that departures may be made therefrom within the scope of the invention which is not to be limited to the illustrative details disclosed.

Having described our invention, what we claim as new and desire to secure by Letters Patent is:

1. An apparatus for transferring fluid from a container having an internal chamber for housing fluid encapsulated by wall portions, the apparatus comprising:
   A. a housing having a recessed area communicating with the exterior of the housing through an opening bounded by a ridge;
   B. means for mounting said housing on a wall portion of the container in communication with said internal chamber thereof and in sealing relation thereto;
   C. a valve assembly mounted in the housing having an opening adapted for communication with the internal chamber of the container, a tubular member mounted on the housing in communication with said opening and having a terminal end portion within the recessed area of the housing and extending to a position substantially not protruding from the recess beyond said ridge and means for sealing said opening having a contact member disposed within said member of the valve assembly and moveable from a first position in sealing relation to said opening to a second position rendering the opening capable of passing fluid therethrough, said member having a proximal end portion communicating with the opening, an internal passage extending from said opening to said terminal end portion, a port in said terminal end portion communicating with the internal passage of the member and housing said contact member in said first position thereof, a spring resiliently retaining the contact member in said first position and a ball gravitationally received in said opening in fluid sealing relation thereto when the contact member is in said first position; and
   D. a coupling for connection to a pump and having a body with a distal portion positionable within said recessed area of the housing about said member of the valve assembly in a fluid transfer position and an actuator engageable with the contact member in said fluid transfer position to move the contact member from the first position to the second position vaccumatically to draw said ball from the opening and said fluid sealing relation thereto by action of said pump when the coupling is in said fluid transfer position and the contact member is in said second position for the removal of fluid from the internal chamber of the container by said pump.

2. The apparatus of claim 1 wherein said spring is a tapered coil spring housed within the internal passage of the member having a small end portion engaging the contact member and a large end portion about said opening and the ball is captured within said tapered coil spring free to be held by gravity in fluid sealing relation to the opening and alternatively to be drawn vaccumatically from said fluid sealing relation by operation of said pump.

3. The apparatus of claim 2 including at least one secondary valve assembly mounted in the housing laterally of said member of the primary valve assembly, the secondary valve assembly including a passage extending through said housing from an opening for communicating with the internal chamber of the container to an opposite opening in communication with the recessed area of the housing, a valve member received within the passage and having a contact portion extending through the opening into the recessed area of the housing in a first position for contact by the body of the coupling in said fluid transfer position to move the valve member to a second position, a spring resiliently retaining the valve member in the first position and a sealing ring engageable by the valve member in said first position to seal said passage wherein, when the coupling is in said fluid transfer position with the valve member in the second position, said secondary valve assembly is disposed in an opened position permitting the admission of air to the internal chamber of the container during the removal of fluid therefrom.

4. The apparatus of claim 1 wherein the terminal end portion of the member of the valve assembly mounts a sealing ring substantially circumscribing the port and engageable with the contact member in the first position in fluid sealing relation.

5. The apparatus of claim 3 wherein the valve member of the secondary valve assembly is of smaller diameter than said passage of the secondary valve assembly having portions extending therefrom for engagement with walls defining said passage to define airways extending about the valve member for the passage of air thereby in said second position.

6. An apparatus for transferring fluid from a container having an internal chamber for housing fluid encapsulated by wall portions, the apparatus comprising:
   A. a housing having a recessed area communicating with the exterior of the housing through an opening bounded by a ridge;
   B. means for mounting said housing on a wall portion of the container in communication with said internal chamber thereof and in sealing relation thereto and wherein said mounting means is secured on the wall portion of the wall portion of the container having an internally screw threaded opening and the housing has external screw threads screwthreadably received in the internal screw threads of the mounting means;
   C. a valve assembly mounted in the housing having an opening adapted for communication with the internal chamber of the container, a member mounted on the housing in communication with said opening and having a terminal end portion within the recessed area of the housing and extending to a position substantially not protruding from the recess beyond said ridge and means for sealing said opening having a contact member disposed within said member of the valve assembly and moveable from a first position in sealing relation to said opening to a second position rendering the opening capable of passing fluid therethrough;

D. a coupling for connection to a pump and having a body with a distal portion positionable within said recessed area of the housing about said member of the valve assembly in a fluid transfer position and an actuator engageable with the contact member in said fluid transfer position to move the contact member from the first position to the second position for the removal of fluid from the internal chamber of the container by said pump; and E. a tool having a sleeve dimensioned for receipt in the recessed area of the housing mounting lugs for engagement with the housing for the application of rotational force to said housing screw-threadably to remove the housing from said mounting means for filling of the container.

7. The apparatus of claim 6 wherein a secondary valve assembly is mounted in the housing discrete from the primary valve assembly for communication with the internal chamber of the container and operable by engagement with the distal portion of the body of the coupling in said fluid transfer position to move from a first position sealing the internal chamber therethrough to a second position admitting air to said internal chamber of the container as fluid is removed from the container by said pump and said sleeve of the tool has a lower portion engageable with said secondary valve assembly when employed to remove said housing to move the secondary valve assembly to said second position to balance air pressure within the internal chamber with ambient air pressure.

8. The apparatus of claim 6 wherein said tool has a shield mounted on said sleeve to deflect fluid which might be discharged upwardly during said removal of the housing.

9. An apparatus for transferring fluid from a container having an internal chamber for housing fluid encapsulated by wall portions, the apparatus comprising:

A. a housing having a recessed area communicating with the exterior of the housing through an opening bounded by a ridge;

B. means for mounting said housing on a wall portion of the container in communication with said internal chamber thereof and in sealing relation thereto;

C. a valve assembly mounted in the housing having an opening adapted for communication with the internal chamber of the container, a tubular member mounted on the housing in communication with said opening and having a terminal end portion within the recessed area of the housing and extending to a position substantially not protruding from the recess beyond said ridge and means for sealing said opening having a contact member disposed within said member of the valve assembly and moveable from a first position in sealing relation to said opening to a second position rendering the opening capable of passing fluid therethrough, said member having a proximal end portion communicating with the opening, an internal passage extending from said opening to said terminal end portion, a port in said terminal end portion communicating with the internal passage of the member and housing said contact member in said first position thereof, a spring resiliently retaining the contact member in said first position and a ball gravitationally received in said opening in fluid sealing relation thereto when the contact member is in said first position;

D. a coupling for connection to a pump and having a body with a distal portion positionable within said recessed area of the housing about said member of the valve assembly in a fluid transfer position and an actuator engageable with the contact member in said fluid transfer position to move the contact member from the first position to the second position vaccumatically to draw said ball from the opening and said fluid sealing relation thereto by action of said pump when the coupling is in said fluid transfer position and the contact member is in said second position for the removal of fluid from the internal chamber of the container by said pump; and E. a secondary valve assembly mounted in the housing discrete from the primary valve assembly for communication with the internal chamber of the container and operable by engagement with the distal portion of the body of the coupling in said fluid transfer position to move from a first position sealing the internal chamber therethrough to a second position admitting air to said internal chamber of the container as fluid is removed from the container by said pump.

10. The apparatus of claim 9 wherein said spring is a tapered coil spring housed within the internal passage of the member having a small end portion engaging the contact member and a large end portion about said opening and the ball is captured within said tapered coil spring free to be held by gravity in fluid sealing relation to the opening and alternatively to be drawn vaccumatically from said fluid sealing relation by operation of said pump.

11. The apparatus of claim 10 including at least one secondary valve assembly mounted in the housing laterally of said member of the primary valve assembly, the secondary valve assembly including a passage extending through said housing from an opening for communicating with the internal chamber of the container to an opposite opening in communication with the recessed area of the housing, a valve member received within the passage and having a contact portion extending through the opening into the recessed area of the housing in a first position for contact by the body of the coupling in said fluid transfer position to move the valve member to a second position, a spring resiliently retaining the valve member in the first position and a sealing ring engageable by the valve member in said first position to seal said passage wherein, when the coupling is in said fluid transfer position with the valve member in the second position, said secondary valve assembly is disposed in an opened position permitting the admission of air to the internal chamber of the container during the removal of fluid therefrom.

12. The apparatus of claim 9 wherein the terminal end portion of the member of the valve assembly mounts a sealing ring substantially circumscribing the port and engageable with the contact member in the first position in fluid sealing realation.

13. The apparatus of claim 11 wherein the valve member of the secondary valve assembly is of smaller diameter than said passage of the secondary valve assembly having portions extending therefrom for engagement with walls defining said passage to define airways extending about the valve member for the passage of air thereby in said second position.

* * * * *

UNITED STATES PATENT AND TRADEMARK OFFICE
CERTIFICATE OF CORRECTION

PATENT NO. : 5,123,441

DATED : June 23, 1992

INVENTOR(S) : Gregory E. Hogue; William M. Finch; John W. Pickrell

It is certified that error appears in the above-identified patent and that said Letters Patent is hereby corrected as shown below:

Page 2, Column 3, Line 10
    Delete "teh" and Insert ---the---

Page 2, Column 4, Line 36
    Delete "of" and Insert ---or---

Page 3, Column 5, Line 14
    Delete "protection" and Insert ---projection---

Page 3, Column 6, Line 4
    Delete "assembly" and Insert ---assemblies---

Page 4, Column 8, Line 49
    Delete "engageing" and Insert ---engaging---

Page 5, Column 10, Line 1
    Insert ---the--- between the words "In" and "alternate"

Page 5, Column 10, Line 11
    Delete "be" and Insert ---the---

UNITED STATES PATENT AND TRADEMARK OFFICE
CERTIFICATE OF CORRECTION

PATENT NO. : 5,123,441
DATED : June 23, 1992
INVENTOR(S) : Gregory E. HOgue; William M. Finch; John W. Pickrell It is certified that error appears in the above-indentified patent and that said Letters Patent is hereby corrected as shown below:

Page 5, Column 10, Line 36

Delete "fluie" and Insert ---fluid---

Page 5, Column 10, Line 46

Delete "teh" and Insert ---the---

Page 5, Column 10, Line 60

Delete "a" and Insert ---the---

Signed and Sealed this

Tenth Day of August, 1993

Attest:

MICHAEL K. KIRK

Attesting Officer     *Acting Commissioner of Patents and Trademarks*